Figure 1:
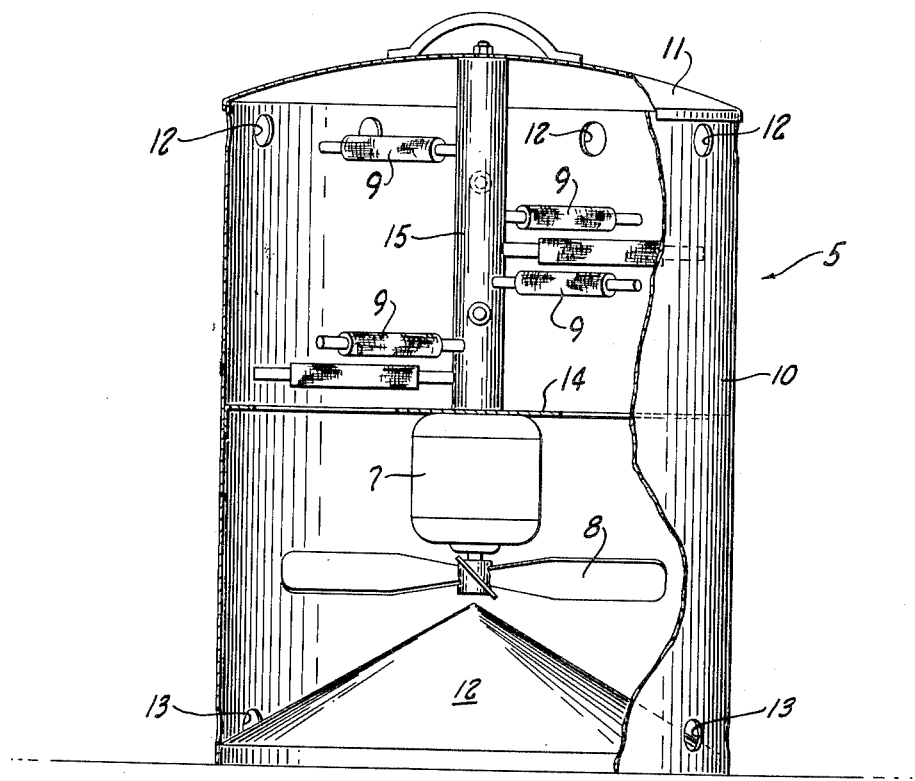

Nov. 13, 1956 — J. T. WILSON ET AL — 2,770,316
APPARATUS FOR COLLECTING AIR CONTAMINANTS
Filed Oct. 21, 1954

Inventors
Jack T. Wilson
Robert J. Byars

United States Patent Office 2,770,316
Patented Nov. 13, 1956

2,770,316

APPARATUS FOR COLLECTING AIR CONTAMINANTS

Jack T. Wilson and Robert J. Byers, Milwaukee, Wis., assignors to The Louis Allis Company, Milwaukee, Wis., a corporation of Wisconsin Application October 21, 1954, Serial No. 463,653

4 Claims. (Cl. 183—2)

This invention relates to apparatus for collecting contaminants which may be present in the air at a given location to enable subsequent analysis of the nature and quantity of such contaminants.

Electric motors are frequently required to operate in a contaminated atmosphere. Since the presence of certain contaminants in the air will markedly affect the life of a motor, and since a knowledge of the nature of air contaminants at a motor location and the quantities in which they exist will permit intelligent selection or design of a motor best capable of resisting the corrosive or other deleterious effects of such contaminants, it is desirable that some means be provided for enabling quantitative and qualitative analysis to be made of air contaminants, and particularly those contaminants which have the greatest effect upon electric motor life.

It is accordingly an object of the present invention to provide apparatus for collecting representative specimens of contaminants which may be present in the atmosphere at a location at which it is intended to install an electric motor, to enable such specimens to be qualitatively and quantitatively analyzed in order that the service conditions under which the motor will have to operate can be definitely ascertained to thereby facilitate selection or design of a motor which can be expected to best resist the deleterious effects of the air contaminants normally to be expected at the motor location.

Another object of this invention resides in the provision of apparatus for collecting representative specimens of air contaminants of the character described, wherein moisture will also be collected in proportion to its prevalence in the air being sampled, so that the possible effects of humidity, including the probability of condensation, can be accounted for in estimating the overall effects of air contaminants upon motor life and in evaluating motor designs.

A further and very important object of this invention resides in the provision of apparatus of the character described for collecting contaminants in air at the proposed location of an electric motor installation, which apparatus will closely reproduce the conditions that will develop within an electric motor as a result of the presence of such contaminants in the air at the location, so that the effects of such air contaminants upon an electric motor can be readily predicted by means of a relatively short test with the apparatus of this invention, the apparatus thus providing a simulated accelerated service test.

Another object of this invention resides in the provision of a collector element for a device of the character described which will react to air contaminants in the same manner as the insulation on the windings of an electric motor, so that the effects of air contaminants at a proposed motor location upon an electric motor can be predicted by direct observation of a collector element of this invention which has been exposed to such contaminants.

With the above and other objects in view, which will appear as the description proceeds, this invention resides in the novel construction, combination and arrangement of parts substantially as hereinafter described and more particularly defined by the appended claims, it being understood that such changes in the precise embodiment of the herein-disclosed invention may be made as come within the scope of the claims.

Figure 2:
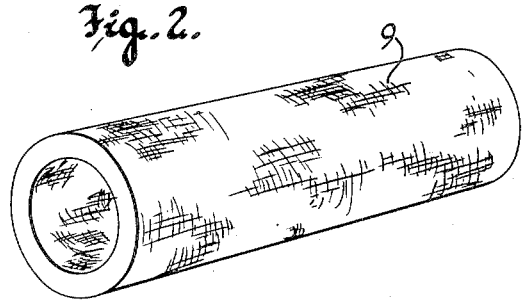

The accompanying drawing illustrates one complete example of the physical embodiment of the invention constructed according to the best mode so far devised for the practical application of the principles thereof, and in which:

Figure 1 is a side elevational view of an air contaminant collector embodying the principles of this invention, portions being cut away to show detail; and Figure 2 is a perspective view of a contaminant collector element of this invention.

Referring now more particularly to the accompanying drawing, the numeral 5 designates generally a substantially cylindrical housing having mounted in its interior an electric motor 7 which drives a fan 8 whereby air is drawn through the housing across collector elements 9 which are a distinctive feature of this invention. The housing preferably comprises a cylindrical side wall 10, a closely fitting removable cover 11 which facilitates access to the fan and collector elements, and a snugly fitting bottom wall 12. To assure that air flow through the housing will be relatively smooth and at a substantially constant rate, the side wall of the housing is provided near its top with a number of inlet ports 12 and near its bottom with a number of outlet ports 13. To further assure smooth air flow through the housing the bottom wall may be substantially conical, diverging downwardly to direct air flow from the fan to the outlet ports, it being understood that the fan is mounted concentrically in the cylindrical housing so that the apex of the conical bottom is directly beneath the hub of the fan. Since the apparatus is intended to be used in atmosphere which is known to be contaminated, the housing is preferably made of non-corrosive material such as stainless steel.

The fan motor is mounted upon a spider-like support 14 which is secured, as by spot welding, to the cylindrical housing wall and extends across the housing transversely to its axis and intermediate its ends. Preferably the fan motor is of the fully enclosed or explosion-proof type.

The support for the collector elements 9 comprises a central stem 15 which extends along the axis of the housing, between the motor support and the cover, being preferably secured to the latter so as to be withdrawn from the housing as the cover is lifted off of it. A plurality of finger-like collector element holders are secured to the supporting stem and project radially therefrom at axially spaced intervals, being disposed at different angles so that the outer ends of the collector element holders describe a helix about the stem. The collector elements carried by the holders 15 are thus substantially uniformly distributed along the airstream which flows through the housing when the fan is in operation.

Preferably the supporting stem and the finger-like holders are made from phenolic material or are coated with phenolic material to enable them to resist corrosion.

Each collector element comprises a woven fibrous sleeve of a size to be easily slipped over and removed from the finger-like holders. This sleeve is impregnated with a hygroscopic, non-volatile liquid such as glycerin so that it will readily collect not only particulated air contaminants but also gaseous and liquid contaminants, together with moisture present in the air, and will retain the same for subsequent analysis in the laboratory. Since the contaminants which have the most serious effect upon motor life are normally those which affect cotton, because that material is used as insulation on most motor windings, the sleeves are preferably made from cotton fabric.

In operation, the apparatus is set up at the location to be checked and the fan is run for a predetermined period of time to draw air in a steady stream across the collector elements. The quantity of contaminants collected on the collector elements during that time interval is of course representative of the total contamination existing at the tested location. Some of the collector elements may have the contaminants removed therefrom in the laboratory, for quantitative and/or qualitative analysis, while others may be observed directly since the reaction of the cotton fabric sleeves comprising the elements will be directly representative of the reaction of cotton insulation on motor windings to the same contaminants.

It will be obvious to those skilled in the art that other features and equipment may be added to the testing apparatus of the instant invention as, for example, gelatin slides for collecting particulated contaminants, as well as liquid filled impinger tubes for the collection of volatile contaminants.

From the foregoing description, taken together with the accompanying drawing, it will be readily apparent that this invention provides an air contaminant collecting apparatus whereby those contaminants which particularly influence electric motor life may be readily collected for quantitative and qualitative laboratory analysis and the nature and quantity of such contaminants and their probable effect upon the insulative covering of an electric motor may be readily determined, both by laboratory analysis and by direct observation of the collector elements.

What we claim as our invention is:

1. An air testing apparatus comprising a housing having an inlet at one end thereof and an outlet at its other end, a fan for causing air to flow through the housing from the inlet to the outlet, and collector means in the housing upon which contaminants in the air flowing therethrough may be deposited to enable analysis of the nature and quantity of contaminants in the air at the location of the apparatus, said apparatus being characterized by the fact that the collector means comprises a holder in the housing having a stem in the housing extending in a direction parallel to the flow of air from the inlet to the outlet and a plurality of spaced-apart finger-like projections radiating therefrom so as to be disposed transversely to the direction of air flow through the housing; and a woven fibrous sleeve readily removably fitted on each of the projections and impregnated with a non-volatile hygroscopic liquid.

2. The apparatus of claim 1 further characterized by the fact that said sleeve is of woven cotton fabric and is impregnated with glycerin.

3. An air contaminant collecting device comprising: a housing having a substantially cylindrical side wall with circumferentially spaced inlet ports near its top and circumferentially spaced outlet ports near its bottom; an electric motor driven fan; a spider-like support mounting the fan in the housing intermediate the top and bottom thereof and with the fan axis substantially coinciding with that of the housing; a removable cover on the housing; a collector element support depending from the cover, said support comprising a central stem, the axis of which substantially coincides with that of the housing, and a plurality of finger-like collector element holders projecting radially from the stem; and a collector element on each of said holders comprising a woven fibrous sleeve impregnated with a non-volatile hygroscopic liquid.

4. The air contaminant collecting device of claim 3, further characterized by a conical downwardly diverging bottom wall in the housing having its apex beneath the hub of the fan and its rim below the outlet ports.

References Cited in the file of this patent

UNITED STATES PATENTS

| | | |
|---|---|---|
| 480,834 | Sheedy | Aug. 16, 1892 |
| 1,538,041 | Horton et al. | May 19, 1925 |
| 2,303,333 | Dauphinee | Dec. 1, 1942 |
| 2,698,671 | Kennette et al. | Jan. 4, 1955 |